March 31, 1931. T. E. KNOWLTON 1,798,609
PLASTER BOARD MANUFACTURE
Filed April 5, 1927

Inventor
Theodore E. Knowlton
By Albert H. Robinson
Attorney

Patented Mar. 31, 1931

1,798,609

UNITED STATES PATENT OFFICE

THEODORE E. KNOWLTON, OF BUFFALO, NEW YORK, ASSIGNOR, BY MESNE ASSIGNMENTS, TO CERTAIN-TEED PRODUCTS CORPORATION, A CORPORATION OF MARYLAND

PLASTER-BOARD MANUFACTURE

Application filed April 5, 1927. Serial No. 181,089.

This invention relates to plaster boards and the like and the method of making same, and especially aims to provide an improved insulating board of superior strength and rigidity.

The invention consists in the features, combinations and arrangements, hereinafter described or claimed, for carrying out the above stated object and such other objects as will hereinafter appear.

The invention may be readily understood by reference to certain exemplifications thereof described in the following specification, such exemplifications comprising a plaster body or the like in which reenforce strips are embedded and cover sheets facing the plaster body. The reenforcing strips are constructed so that interrupted surfaces of substantial areas are adapted for adherence to the cover sheets, thereby providing maximum union between the cover sheets and the plaster body.

Figure 1:
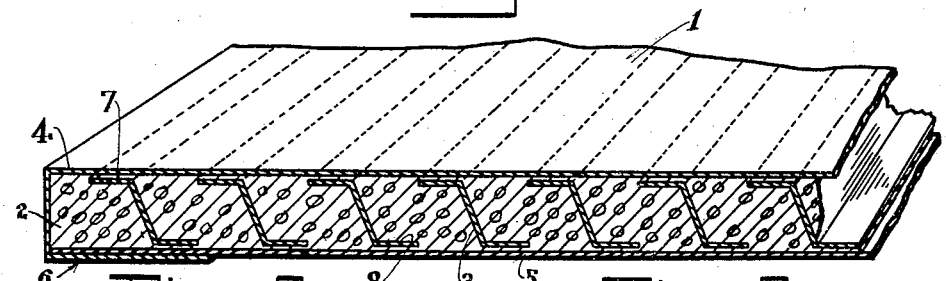

In the accompanying drawings;

Fig. 1 is a perspective view of a fragment of plaster board made in accordance with my invention;

Figs. 2 to 7 inclusive illustrate various modified forms of the invention.

The illustrative boards are made by what is known as the continuous process wherein cover sheets are continuously fed into the receiving end of a plaster board apparatus while a plastic mixture and embedded reenforcing strips are concomitantly inserted between them. During the process of forming the board, the cover sheets are reduced to desired widths, one of which in making a closed edge board may be of sufficient width to enclose the edges of the plaster body and overlap the margins of the opposite sheet to which it is adhered. At an appropriate time during the process, the interrupted areas of the reenforcing strips are coated with an adhesive and compressed against the face sheets to securely bond same together. Subsequently the board is subjected to forming devices which reduce it to the proper thickness.

The board is made in a continuous strip or sheet, moving through the apparatus to the delivery end where it is cut into suitable lengths as soon as the plaster has become sufficiently hard to permit the board to be handled. These lengths are then usually conveyed to dryers where all excess moisture is removed.

Referring to the illustrative embodiment in Fig. 1, the board is designated generally by numeral 1 comprising plaster body 2 in which reenforce strips 3 are embedded and cover sheets 4 and 5 facing the plaster body, one of which 4 may be overturned at 6 to be adhered to the margin of the other sheet 5. Any suitable adhesive may be employed to bond the overlapping margins of the face sheets.

Reenforcing strips 3 may be fed into the receiving end of a plaster board machine from a plurality of feed rolls, each of which has previously been cut to the proper width, or they may be supplied from a single supply roll and then cut into a plurality of narrow strips. As the strips are being fed into the apparatus, they are preferably scored to facilitate bending of the margins 7 and 8 at an angle to the main part, thereby providing substantial areas to be adhered to the face sheets. Also, the lips are preferably bent in opposite directions from the strips in order to cooperate with each other when embedded in the plaster board to form a substantially continuous reenforcement for each cover sheet and provide a strong enclosure for the plaster body.

A construction as above described is particularly adapted for a cellular composition body such as a gypsum mixture which upon being mixed with water will generate a gas and leave when set a resulting structure that contains numerous small cells. When this cellular composition is used for the plaster body in a fibrous covered plaster board, the cover sheets have a tendency to break away, probably due to the fact that the walls of the cells are thin and brittle.

I have discovered that this cellular composition may be employed to provide a suitable bond between the core and the sheets by compressing the composition prior to its setting into a dense compact mass immediately beneath the cover sheets, thereby providing a dense shell of the mixture for encasing a cellular core of the same mixture and bonding same to the cover sheets.

Means are provided in the illustrative embodiment to contact with the lips of the reenforce strips to compress the plaster mixture between the lips and the sheets for removing the cells, leaving this part of the mixture dense and securely bonded to the strips and cover sheets. The preliminary pressure squeezes out the water at this point and hastens setting of the plastic mixture. Subsequent subjection of the sheet to the forming devices further compresses that portion of the mixture immediately beneath the cover sheets.

While I have illustrated employment of the plastic composition for cover sheets to the plaster body, it will be understood that any other adhesive may be employed. For example, silicate of soda may advantageously be applied to the lips of the reenforcing strips or to that portion of the cover sheets to which the reenforcing strips are adhered for bonding the strips and cover sheets.

Figure 2:
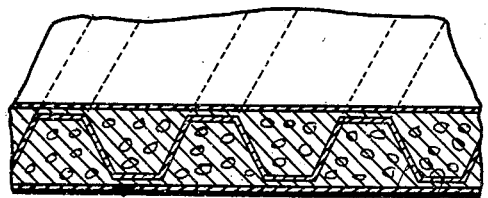
Figure 3:
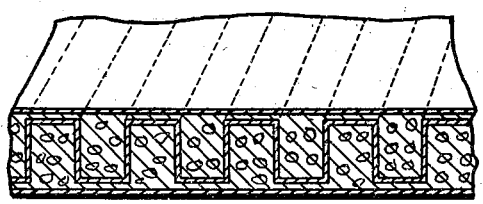
Figure 6:
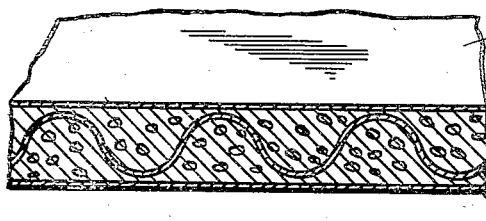

In Figs. 2, 3, and 6 the reenforce is disclosed in the form of single strip 9 having a series of undulations 10 which are alternately adhered to the opposite face sheets.

Figure 4:
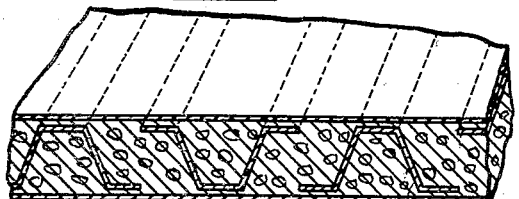
Figure 5:
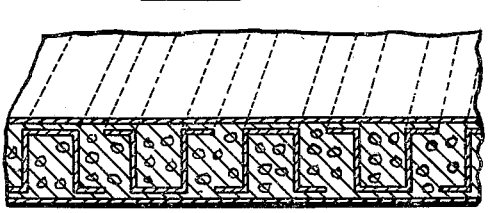

In Figs. 4 and 5 modified forms of individual strips 11 are disclosed similar to the single strips 9 in Figs. 2, 3, and 6, but with the undulated parts alternately laid in reverse position.

Figure 7:
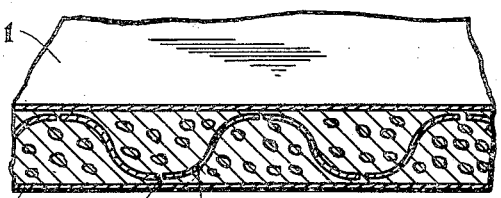

The modification in Fig. 7 shows in the undulations 10 of strip 9 recesses 12 in which the adhesive material is adapted to be compressed and positively engage the undulations.

Obviously the invention is not limited to the details of the illustrative boards or the method for manufacturing it, all or any of which may be variously modified. Moreover, it is not indispensible that all features of the invention be used conjointly, as certain features may be employed to advantage in various different combinations and subcombinations.

Having thus described various embodiments of my invention, I claim:—

1. The method of manufacturing plaster boards comprising traversing a sheet of fibrous material to receive a deposit of cellular plastic mixture, embedding a reenforcing strip in the plastic mixture, compressing the reenforcing strip against the fibrous sheet to compact the mixture, and compressing a cover sheet over the reenforcing strip and plastic mixture.

2. The method of manufacturing plaster boards comprising traversing a sheet of fibrous material to receive a deposit of cellular plastic material, adhering reenforcing strips to the sheet, adhering a cover sheet to the reenforce and cellular material and compressing the board to compact the cellular material immediately beneath the cover sheets.

3. The method of manufacturing plaster boards comprising traversing a fibrous sheet to receive a cellular plastic mixture, adhesively joining a reenforcing strip to the sheet and embedding same in the plastic mixture, adhesively joining a cover sheet to the reenforcing strip and plastic mixture, and compressing the resulting board to compact the material immediately beneath the cover sheet.

4. The method of manufacturing plaster boards consisting of providing a cover sheet, depositing a cellular plastic mixture thereon, embedding a reenforcing strip in said mixture, covering the mixture with another cover sheet, and compacting the cellular mixture between the cover sheets and the reenforcements.

5. In a cellular plaster board, reenforcing means comprising squeezed-out cellular gypsum uniting the reenforcing strips to the cover sheets.

6. In a plaster board having cellular gypsum as a plastic mix, reenforcing strips, and reenforcing means comprising squeezed-out cellular gypsum uniting the reenforcing strips to the cover sheets.

In testimony whereof, I affix my signature.

THEODORE E. KNOWLTON.